United States Patent
Park et al.

(10) Patent No.: US 8,169,411 B2
(45) Date of Patent: May 1, 2012

(54) TOUCH SCREEN DEVICE AND OPERATING METHOD THEREOF

(75) Inventors: Ho Joo Park, Seoul (KR); Seung Jun Bae, Busan (KR); Yoon Hee Koo, Sacheon (KR); Seong Cheol Kang, Osan (KR)

(73) Assignee: LG Electronics Inc., Seoul (KR)

( * ) Notice: Subject to any disclaimer, the term of this patent is extended or adjusted under 35 U.S.C. 154(b) by 890 days.

(21) Appl. No.: 11/646,585

(22) Filed: Dec. 28, 2006

(65) Prior Publication Data

US 2007/0273673 A1   Nov. 29, 2007

(30) Foreign Application Priority Data

May 24, 2006   (KR) ........................ 10-2006-0046715

(51) Int. Cl.
*G06F 3/041* (2006.01)
(52) U.S. Cl. ............................ 345/173; 345/179; 381/74
(58) Field of Classification Search .................. 345/173, 345/179; 702/150; 381/74; 348/553
See application file for complete search history.

(56) References Cited

U.S. PATENT DOCUMENTS

| | | | |
|---|---|---|---|
| 5,140,678 A | 8/1992 | Torres | |
| 5,191,645 A | 3/1993 | Carlucci et al. | |
| 5,495,566 A | 2/1996 | Kwatinetz | |
| 5,523,775 A | 6/1996 | Capps | |
| 5,526,011 A | 6/1996 | Hix et al. | |
| 5,548,705 A | 8/1996 | Moran et al. | |
| 5,559,944 A | 9/1996 | Ono | |
| 5,570,113 A | 10/1996 | Zetts | |
| 5,586,235 A | 12/1996 | Kauffman | |
| 5,592,608 A | 1/1997 | Weber et al. | |
| 5,596,699 A | 1/1997 | Driskell | |
| 5,757,368 A | 5/1998 | Gerpheide et al. | |
| 5,794,127 A | 8/1998 | Lansang | |
| 5,796,406 A | 8/1998 | Shigematsu et al. | |
| 5,821,936 A | 10/1998 | Shaffer et al. | |
| 5,831,616 A | 11/1998 | Lee | |
| 5,880,743 A | 3/1999 | Moran et al. | |

(Continued)

FOREIGN PATENT DOCUMENTS

AU   2006330724   11/2006

(Continued)

OTHER PUBLICATIONS

Indian Office Action dated Nov. 16, 2009.

(Continued)

*Primary Examiner* — Amare Mengistu
*Assistant Examiner* — Joseph G Rodriguez
(74) *Attorney, Agent, or Firm* — KED & Associates, LLP

(57) ABSTRACT

A touch screen device and an operating method thereof are provided. More specifically, a touch screen device is provided which allows a user to selectively restrict input through a touch screen. The touch screen device includes a screen that includes a display configured to display images thereon and a detector configured to detect a touch on the display and convert the touch into an electrical signal, and a controller configured to cause images to be displayed on the display and receive and process signals from the detector. Further, a user may determine whether the controller is operated according to the signal input into the detector. The determination may be made either by a switch separately installed on an earphone or by inputting a signal into the detector by a user.

4 Claims, 7 Drawing Sheets

U.S. PATENT DOCUMENTS

| | | | |
|---|---|---|---|
| 6,094,197 | A | 7/2000 | Buxton et al. |
| 6,097,387 | A | 8/2000 | Sciammarella et al. |
| 6,107,997 | A | 8/2000 | Ure |
| 6,121,960 | A | 9/2000 | Carroll et al. |
| 6,259,436 | B1 | 7/2001 | Moon et al. |
| 6,310,615 | B1 | 10/2001 | Davis et al. |
| 6,334,003 | B1 | 12/2001 | Yokota |
| 6,414,700 | B1 | 7/2002 | Kurtenbach et al. |
| 6,433,801 | B1 | 8/2002 | Moon et al. |
| 6,459,442 | B1 | 10/2002 | Edwards et al. |
| 6,476,796 | B1 | 11/2002 | Kuzunuki et al. |
| 6,525,749 | B1 | 2/2003 | Moran et al. |
| 6,560,281 | B1 | 5/2003 | Black et al. |
| 6,618,063 | B1 | 9/2003 | Kurtenbach |
| 6,724,370 | B2 | 4/2004 | Dutta et al. |
| 6,738,050 | B2 | 5/2004 | Comiskey et al. |
| 6,753,892 | B2 | 6/2004 | Chung |
| 6,765,557 | B1 | 7/2004 | Segal et al. |
| 6,883,140 | B1 | 4/2005 | Acker et al. |
| 6,883,145 | B2 | 4/2005 | Jaeger ............................ 715/767 |
| 6,900,835 | B2 | 5/2005 | Cazier et al. |
| 6,915,492 | B2 | 7/2005 | Kurtenbach et al. |
| 6,940,494 | B2 | 9/2005 | Hoshino et al. |
| 6,957,395 | B1 | 10/2005 | Jobs et al. |
| 6,958,749 | B1 | 10/2005 | Matsushita et al. |
| 6,965,377 | B2 | 11/2005 | Yanagisawa et al. |
| 7,015,932 | B1 | 3/2006 | Koike et al. |
| 7,031,756 | B1 | 4/2006 | Sim et al. |
| 7,035,720 | B2 | 4/2006 | Taxis |
| 7,046,230 | B2 | 5/2006 | Zadesky et al. |
| 7,047,503 | B1 | 5/2006 | Parrish et al. |
| 7,158,913 | B2 * | 1/2007 | Park et al. ...................... 702/150 |
| 7,162,685 | B2 | 1/2007 | Saito |
| 7,164,410 | B2 | 1/2007 | Kupka |
| 7,164,432 | B1 | 1/2007 | Amemiya |
| 7,242,323 | B2 | 7/2007 | Sato et al. |
| 7,345,671 | B2 | 3/2008 | Robbin et al. |
| 7,348,967 | B2 | 3/2008 | Zadesky et al. ................ 345/173 |
| 7,406,666 | B2 | 7/2008 | Davis et al. |
| 7,434,177 | B1 | 10/2008 | Ording et al. |
| 7,456,823 | B2 | 11/2008 | Poupyrev et al. |
| 7,469,388 | B1 | 12/2008 | Baudisch et al. |
| 7,486,279 | B2 | 2/2009 | Wong et al. |
| 7,509,588 | B2 | 3/2009 | Van Os et al. |
| 7,898,529 | B2 | 3/2011 | Fitzmaurice et al. |
| 2001/0019374 | A1 | 9/2001 | Izumi et al. |
| 2002/0011990 | A1 | 1/2002 | Anwar |
| 2002/0015064 | A1 | 2/2002 | Robotham et al. |
| 2002/0103616 | A1 | 8/2002 | Park et al. |
| 2002/0149569 | A1 | 10/2002 | Dutta et al. |
| 2002/0149605 | A1 | 10/2002 | Grossman |
| 2003/0076306 | A1 | 4/2003 | Zadesky et al. |
| 2003/0142123 | A1 | 7/2003 | Malamud et al. |
| 2003/0174149 | A1 | 9/2003 | Fujisaki et al. |
| 2003/0234772 | A1 | 12/2003 | Zhang et al. |
| 2004/0056839 | A1 | 3/2004 | Yoshihara |
| 2004/0095395 | A1 | 5/2004 | Kurtenbach |
| 2004/0100479 | A1 | 5/2004 | Nakano et al. |
| 2005/0024322 | A1 | 2/2005 | Kupka |
| 2005/0024341 | A1 | 2/2005 | Gillespie et al. |
| 2005/0047629 | A1 | 3/2005 | Farrell et al. |
| 2005/0176502 | A1 | 8/2005 | Nishimura et al. |
| 2005/0193017 | A1 * | 9/2005 | Kim ........................... 707/104.1 |
| 2005/0193351 | A1 | 9/2005 | Huoviala |
| 2005/0251748 | A1 | 11/2005 | Gusmorino et al. |
| 2006/0013079 | A1 * | 1/2006 | Rekimoto .................. 369/30.01 |
| 2006/0026535 | A1 | 2/2006 | Hotelling et al. |
| 2006/0026536 | A1 | 2/2006 | Hotelling et al. |
| 2006/0026539 | A1 | 2/2006 | Hotelling et al. |
| 2006/0085767 | A1 | 4/2006 | Hinckley et al. |
| 2006/0159279 | A1 * | 7/2006 | Kuo et al. ....................... 381/74 |
| 2006/0256091 | A1 | 11/2006 | Hino |
| 2006/0271947 | A1 | 11/2006 | Lienhart et al. |
| 2007/0018968 | A1 | 1/2007 | Iwamoto et al. |
| 2007/0030257 | A1 * | 2/2007 | Bhogal et al. ................. 345/179 |
| 2007/0033539 | A1 | 2/2007 | Thielman et al. |
| 2007/0075980 | A1 | 4/2007 | Hsieh et al. |
| 2007/0125860 | A1 | 6/2007 | Lapstun et al. |
| 2007/0136690 | A1 | 6/2007 | MacLaurin et al. |
| 2007/0146544 | A1 * | 6/2007 | Liu et al. ....................... 348/553 |
| 2007/0150842 | A1 * | 6/2007 | Chaudhri et al. ............. 715/863 |
| 2007/0180392 | A1 | 8/2007 | Russo |
| 2007/0273663 | A1 | 11/2007 | Park et al. |
| 2008/0150905 | A1 | 6/2008 | Grivna et al. |
| 2008/0282158 | A1 | 11/2008 | Aaltonen et al. |
| 2009/0119613 | A1 | 5/2009 | Nakaya |

FOREIGN PATENT DOCUMENTS

| | | |
|---|---|---|
| EP | 0 604 346 | 6/1994 |
| EP | 1 028 570 | 8/2000 |
| EP | 1 037 135 | 9/2000 |
| GB | 2329813 | 3/1999 |
| JP | 05-158616 | 6/1993 |
| JP | 2002041242 | 2/2002 |
| TW | 580636 | 3/2004 |
| TW | 580652 | 3/2004 |
| TW | 583552 | 4/2004 |
| TW | 200406734 | 5/2004 |
| TW | 200410853 | 7/2004 |
| TW | I236630 | 7/2005 |
| TW | M282290 | 12/2005 |
| WO | WO 00/38042 | 6/2000 |
| WO | WO 00/75766 | 12/2000 |
| WO | WO2005/073954 | 8/2005 |

OTHER PUBLICATIONS

Office Action dated Nov. 13, 2009 for U.S. Appl. No. 11/646,613.
Office Action dated Nov. 13, 2009 for U.S. Appl. No. 11/785,405.
Office Action dated Oct. 20, 2009 for U.S. Appl. No. 11/646,604.
Office Action dated Sep. 18, 2009 for U.S. Appl. No. 11/646,586.
Office Action dated Nov. 3, 2009 for U.S. Appl. No. 11/785,402.
Office Action dated Nov. 13, 2009 for U.S. Appl. No. 11/646,587.
Office Action dated Dec. 4, 2009 for U.S. Appl. No. 11/785,401.
Taiwanese Office Action issued in TW Application No. 095147947 dated Dec. 29, 2009 (translation).
U.S. Office Action issued in U.S. Appl. No. 11/785,400 dated Feb. 4, 2010.
U.S. Office Action issued in U.S. Appl. No. 11/646,598 dated Feb. 26, 2010.
U.S. Office Action issued in U.S. Appl. No. 11/646,613 dated Feb. 2, 2010, superceded by Office Action issued Mar. 8, 2010.
U.S. Office Action issued in U.S. Appl. No. 11/646,597 dated Mar. 8, 2010.
U.S. Office Action issued in U.S. Appl. No. 11/646,586 dated Mar. 10, 2010.
Andrew Sears and Ben Shneiderman Split menus: Effectively using selection frequency to organize menus ACM Transactions on Computer-Human Interaction, vol. 1, No. 1, Mar. 1994, pp. 27-51.
Article by Greg Scoblete, Sandisk Introduces Flash Drives, MP3 Players, TWICE, Jan. 20, 2006, 21, 3; Research Library, p. 4.
SanDisk Sana™ e200 User Guide.
U.S. Office Action issued in U.S. Appl. No. 11/785,405 dated Jun. 4, 2010.
Indian Office Action issued in Indian Application No. 101/MUM/2007 dated May 12, 2010.
Taiwanese Office Action in issued in TW Application No. 095147942 dated Jun. 8, 2010.
Taiwanese Office Action in issued in TW Application No. 095147085 dated Jun. 9, 2010.
Taiwanese Office Action issued in TW Application No. 095147940 dated Jun. 15, 2010.
U.S. Office Action issued in U.S. Appl. No. 11/646,598 dated Aug. 2, 2010.
U.S. Office Action issued in U.S. Appl. No. 11/646,613 dated Aug. 4, 2010.
European Search Report for EP 07 10 0400 dated Oct. 20, 2010.
U.S. Appl. No. 11/785,403 dated Jan. 7, 2010.
U.S. Office Action issued in U.S. Appl. No. 11/785,404 dated Mar. 25, 2010.
U.S. Office Action issued in U.S. Appl. No. 11/785,399 dated Apr. 1, 2010.

U.S. Office Action issued in U.S. Appl. No. 11/785,403 dated May 12, 2010.
Article by Greg Scoblete, Sandisk Introduces Flash Drives, MP3 Players, TWICE, Jan. 20, 2006, 21, 3; Research Library, p. 4.
U.S. Office Action issued in U.S. Appl. No. 11/785,403 dated Oct. 25, 2010.
Taiwanese Office Action issued in TW Application No. 95147944 dated Aug. 27, 2010 (English translation).
Final Office Action issued in U.S. Appl. No. 11/785,399 dated Nov. 16, 2010.
Final Office Action issued in U.S. Appl. No. 11/785,405 dated Nov. 22, 2010.
Office Action issued in U.S. Appl. No. 11/646,597 dated Dec. 21, 2010.
Supplemental Final Office Action issued in U.S. Appl. No. 11/785,399 dated Jan. 4, 2011.
Office Action issued in U.S. Appl. No. 11/646,613 dated Jan. 6, 2011.
Notice of Allowance issued in U.S. Appl. No. 11/646,598 dated Feb. 14, 2011.
U.S. Office Action issued in U.S. Appl. No. 11/785,404 dated Mar. 1, 2011.
U.S. Office Action issued in U.S. Appl. No. 11/646,613 dated Mar. 7, 2011.
U.S. Office Action issued in U.S. Appl. No. 11/785,399 dated Mar. 16, 2011.
U.S. Final Office Action issued in U.S. Appl. No. 11/646,597 dated May 19, 2011.
U.S. Office Action issued in U.S. Appl. No. 11/785,405 dated Jun. 7, 2011.
U.S. Office Action issued in U.S. Appl. No. 11/785,403 dated Jun. 22, 2011.
European Search Report issued in EP Application No. 07100272.9 dated Aug. 19, 2011.
U.S. Office Action issued in U.S. Appl. No. 11/785,404 dated Aug. 30, 2011.
U.S. Office Action issued in U.S. Appl. No. 12/368,379 dated Sep. 14, 2011.
U.S. Office Action issued in U.S. Appl. No. 11/785,404 dated Sep. 1, 2010.

* cited by examiner

TOUCH SCREEN DEVICE AND OPERATING METHOD THEREOF

BACKGROUND

1. Field

A touch screen device and operating method thereof are disclosed herein.

2. Background of the Related Art

Recently, digital equipment, such as MP3 players, multimedia players (PMP), personal digital assistants (PDA), or notebook computers, capable of playing, for example, audio, video, or avi digital files, such as MP3 files, store a plurality of digital files, and play back the files selected at the request of a user. In order to select and play back the audio, video, or avi files, a user selects and plays back the desired files by operating keys on a keypad provided on digital equipment.

That is, the user operates key buttons on the keypad to select the audio, video, or avi files. Generally, users want an overall size of the digital equipment to be small, while a size of a display of the digital equipment to be larger. Therefore, digital equipment having a touch screen capable of selecting files using, for example, a finger or stylus pen, instead of physical key buttons, are widely used. Since the aforementioned MP3 player, PMP, or PDA which generally comprise most of the portable digital equipment on sale today, should have a display as large as possible within a limited size range of the digital equipment, a touch screen is employed as a user information input device in place of the key button input method.

Since the touch screen also has the function of a display unit, information can be input or selected using, for example, a finger or stylus pen, and the relevant information can be displayed according to the input or selection. Therefore, a list of audio, video, or avi files is also displayed on the touch screen. Further, if a user touches and selects desired files from the file list, the selected files are played back by a predetermined program, for example, a music playback program or Windows Media Player.

However, the aforementioned prior art has at least the following problems. If a physical force is inadvertently applied to the touchpad when, for example, a user puts the digital equipment in a pocket or bag, the inadvertently applied force may be recognized as a user input. Therefore, there is the problem that the digital equipment may be inadvertently operated.

BRIEF DESCRIPTION OF THE DRAWINGS

Embodiments will be described in detail with reference to the following drawings in which like reference numerals refer to like elements wherein.

DETAILED DESCRIPTION

Hereinafter, embodiments of a touch screen device and an operating method thereof will be described in detail with reference to the accompanying drawings.

A touch screen device according to embodiments is described herein used with an exemplary MP3 player. One of ordinary skill in the art will recognize that the touch screen device according to embodiments may also be utilized with other digital equipment, such as a portable media player, a PDA, a portable terminal, a navigation system, or a notebook computer. Moreover, the touch screen device according to embodiments may be used with electronic books, newspapers, magazines, etc., different portable devices, e.g., handsets, MP3 players, notebook computers, etc., audio applications, navigation applications, televisions, monitors, or other types of devices using a display, either monochrome or color. Further, touch may include any type of direct or indirect touch or contact, using, for example, a finger or stylus.

Figure 1:
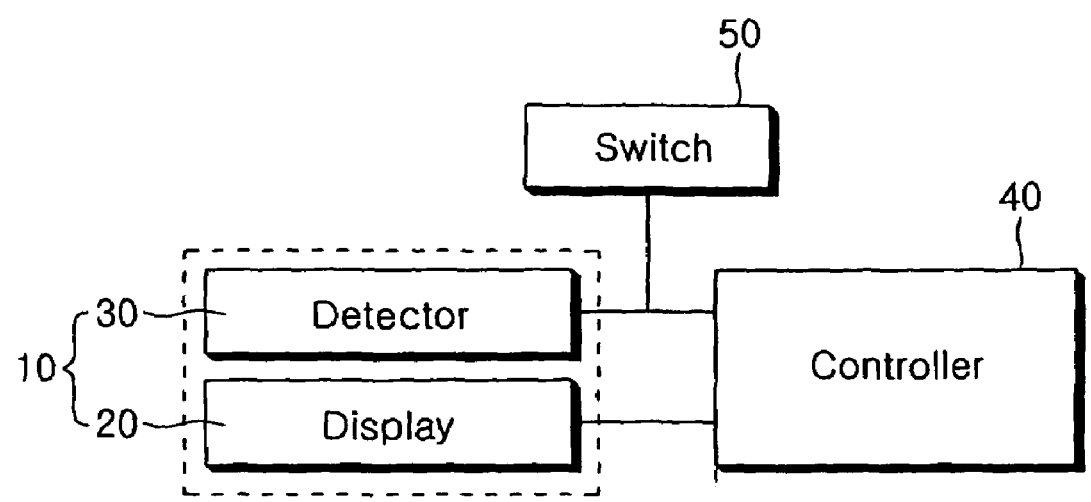
FIG. 1 is a block diagram of a touch screen device according to an embodiment.
Figure 2:
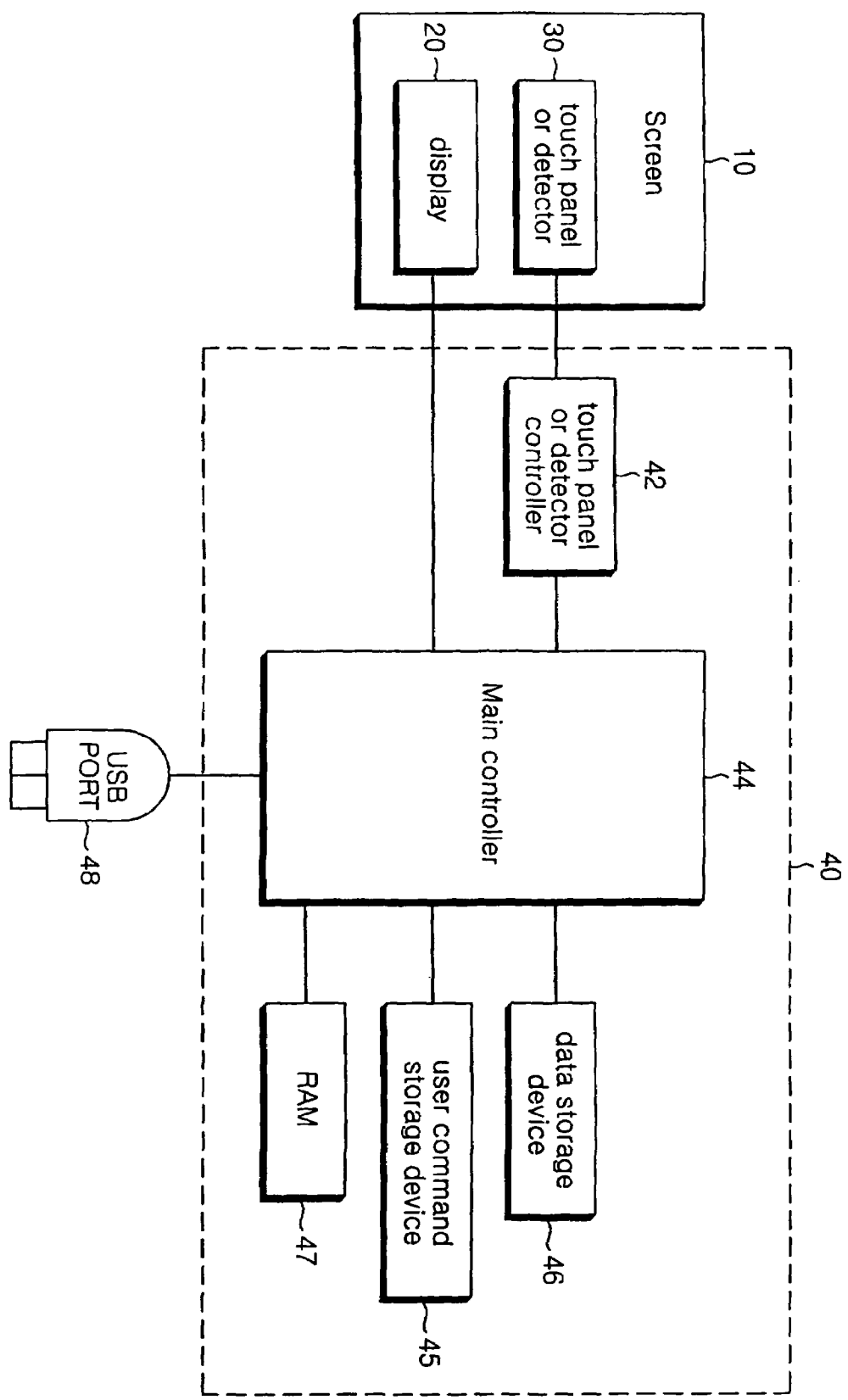
FIG. 2 is a block diagram of a touch screen device according to an embodiment.
Figure 3A:
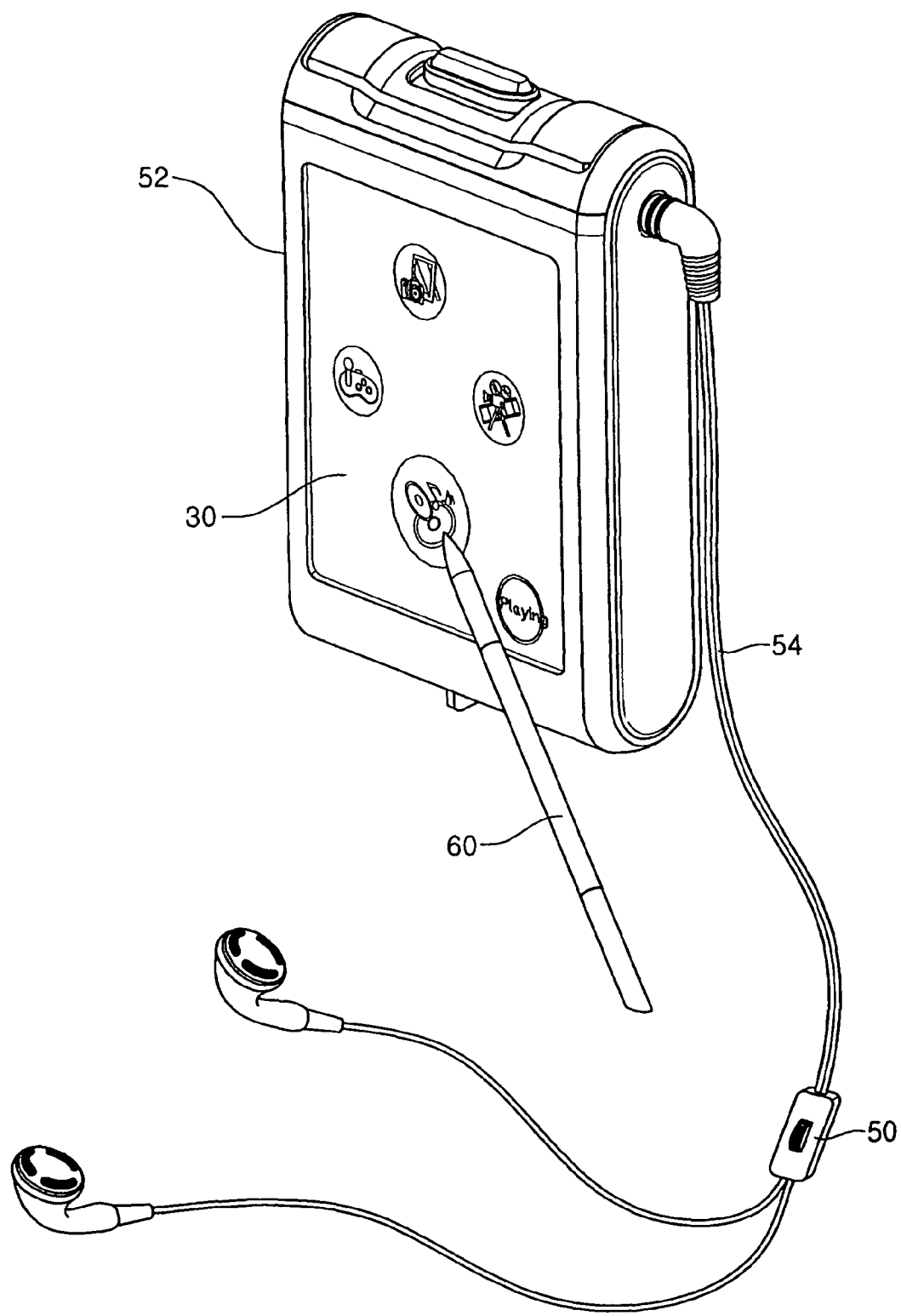
FIG. 3A is a perspective view of an exemplary MP3 player utilizing a touch screen device according to an embodiment.
Figure 3B:
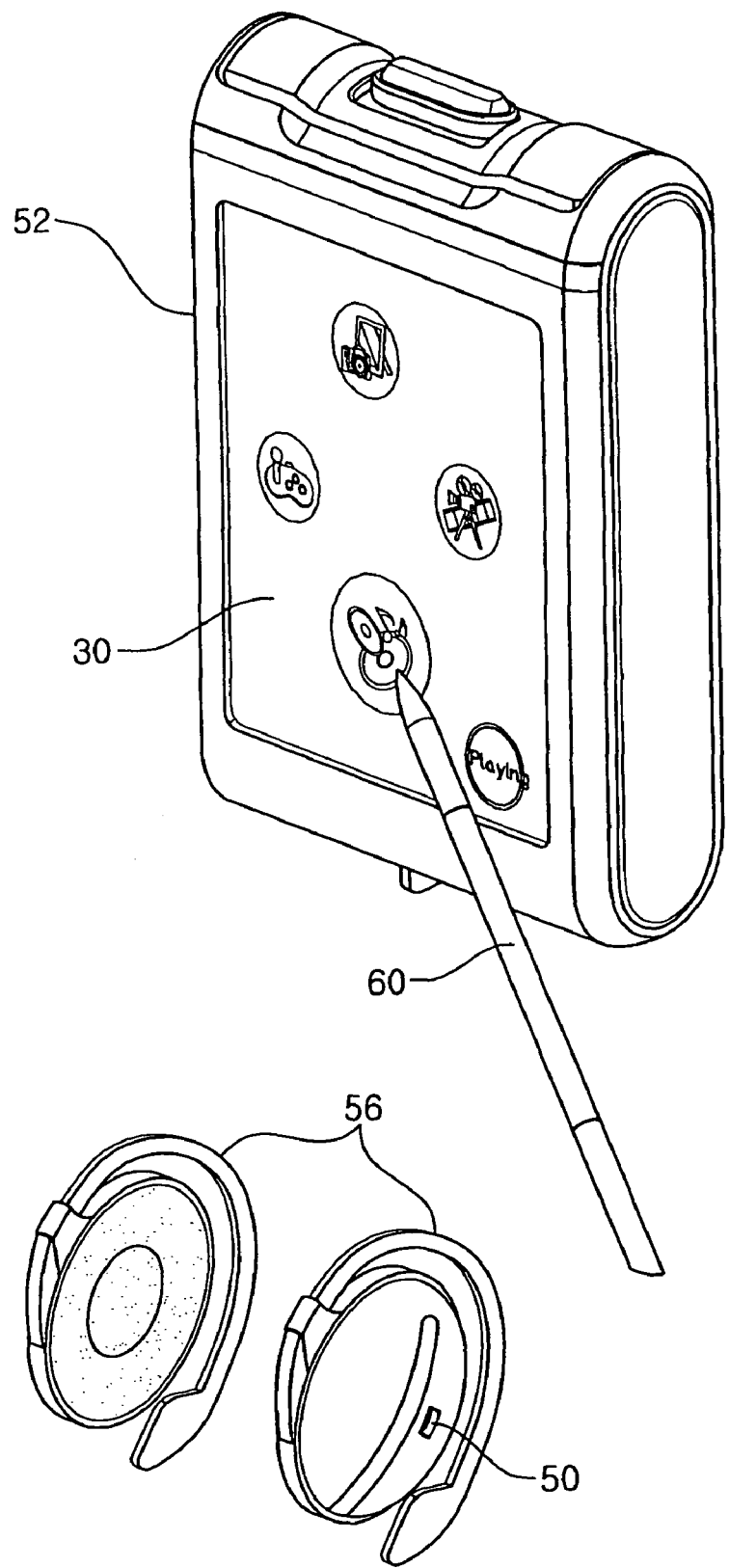
FIG. 3B is a perspective view of an exemplary MP3 player utilizing a touch screen device according to another embodiment.
Figure 4:
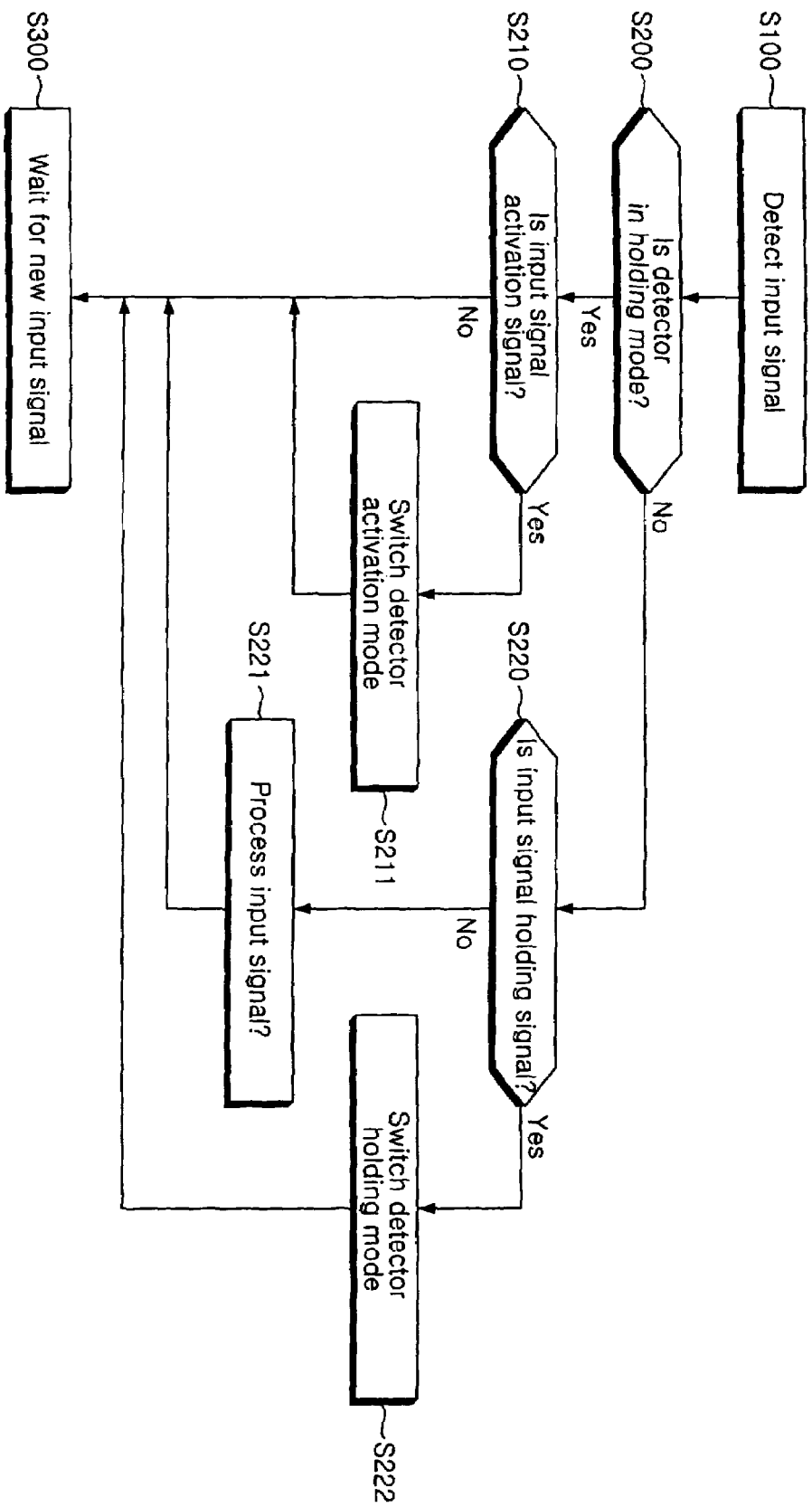
FIG. 4 is a flowchart of an operating method according to an embodiment.
Figure 5A:
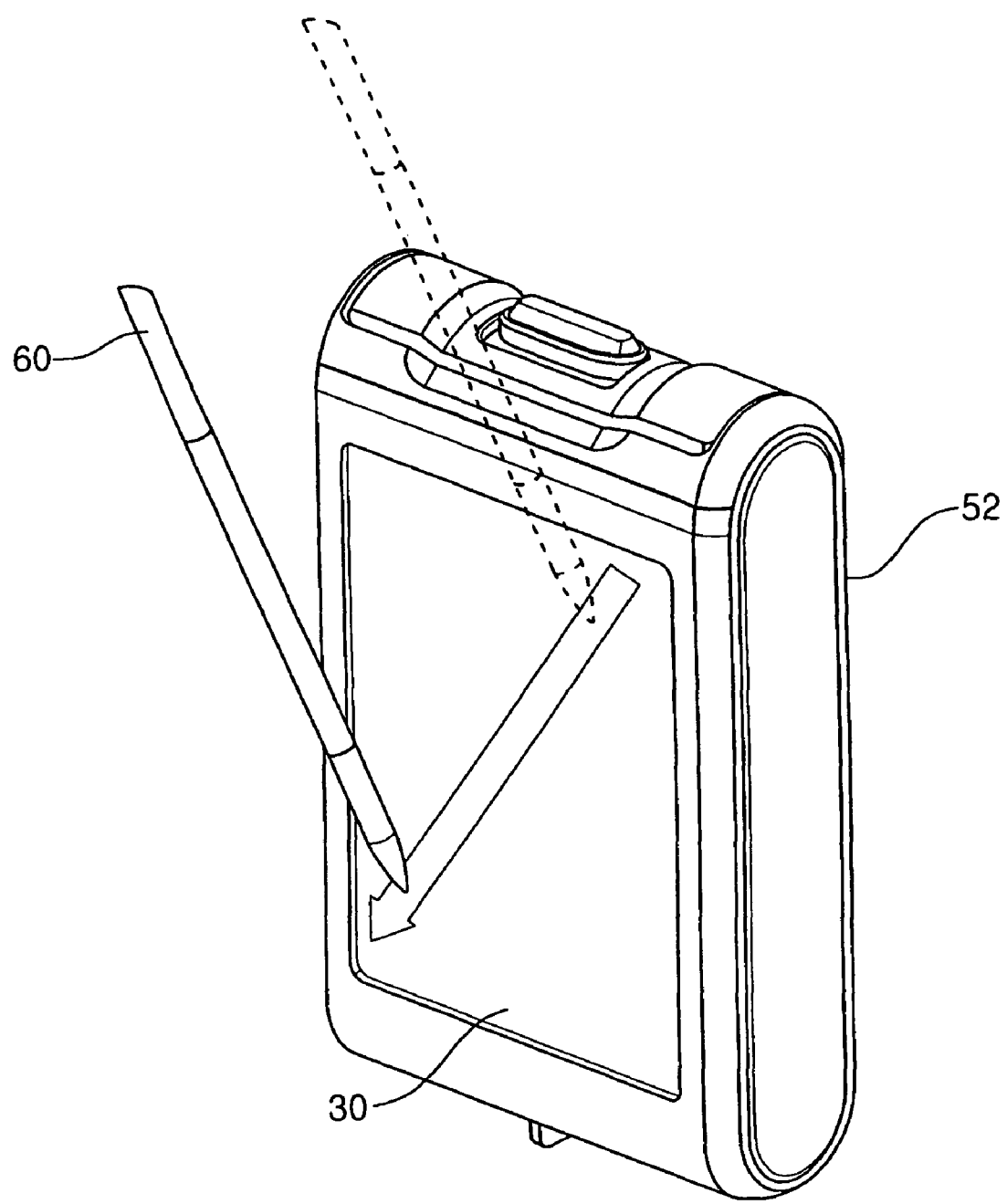
FIG. 5A is an exemplary view illustrating an example in which a holding signal is input to a touch screen device according to an embodiment.
Figure 5B:
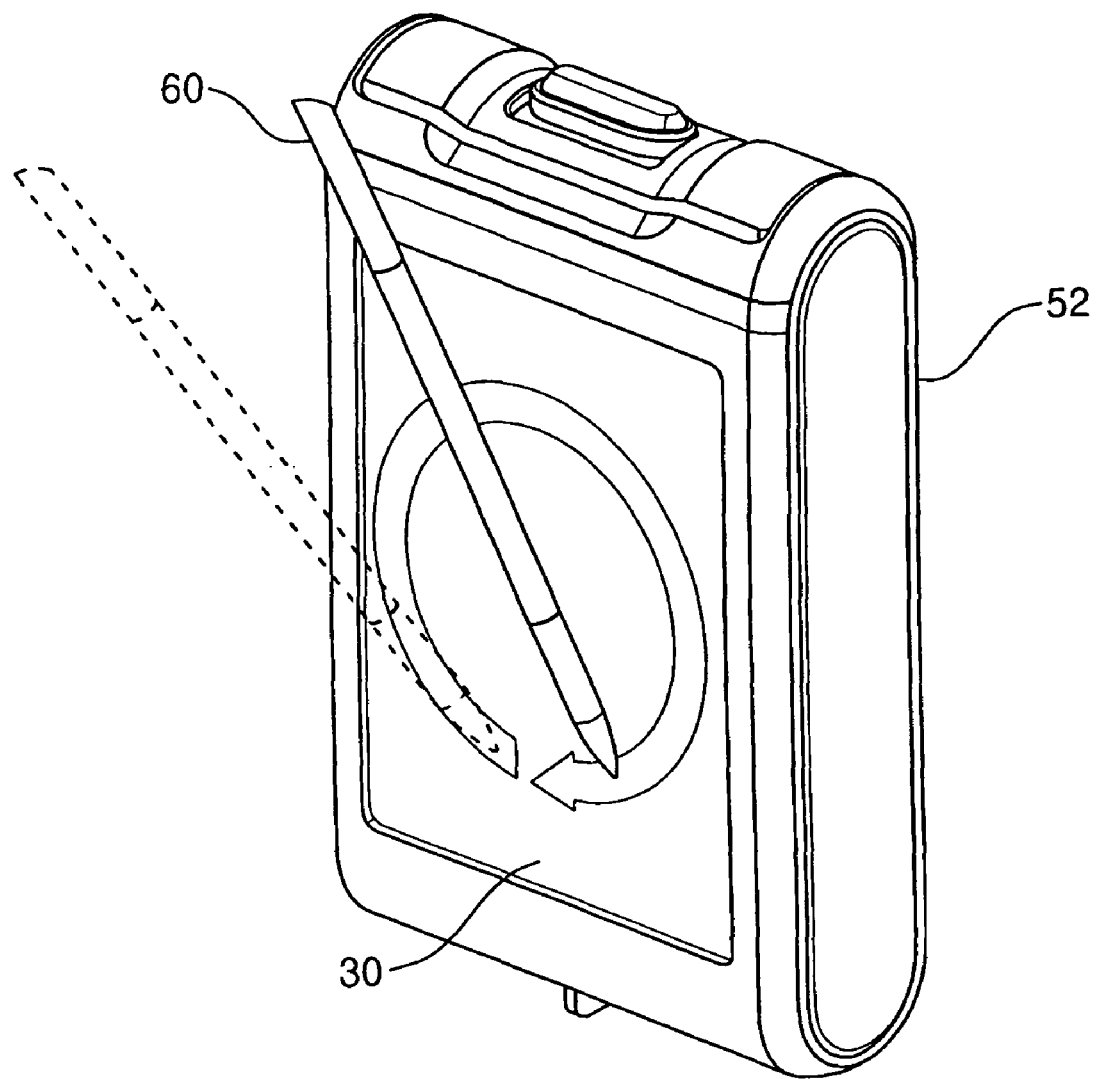
FIG. 5B is an exemplary view showing another example in which an activation signal is input to a touch screen device according to an embodiment.

FIG. 1 is a block diagram of a touch screen device according to an embodiment. FIG. 2 is a block diagram of a touch screen device according to an embodiment. FIG. 3A is a perspective view of an exemplary MP3 player utilizing a touch screen device according to an embodiment. FIG. 3B is a perspective view of an exemplary MP3 player to which a touch screen device according to another embodiment. FIG. 4 is a flowchart of an operating method according to an embodiment. FIG. 5A is an exemplary view showing an example in which a holding signal is input to a touch screen device. FIG. 5B is an exemplary view showing another example in which an activation signal is input to a touch screen device according to another embodiment.

As shown FIG. 1, a touch screen device 1 according to an embodiment may comprise a screen 10 serving as a touch screen. The screen 10 may comprise a display 20 for display images thereon and a detector 30 provided on a front surface of the display 20 for detecting a touch on the screen 10 and converting a physical signal corresponding to the touch into an electrical signal. The display may be, for example, a liquid crystal display (LCD), a plasma display panel (PDP), a light emitting diode (LED), or an organic light emitting diode (OLED).

The detector 30 may use various operating methods for touch detection, including a resistive method, a capacitive method, or an acoustic wave method. In one embodiment, a resistive touch screen may be utilized. In such a case, two layers coated with resistive elements may be spaced apart from each other by a certain distance, and insulation protrusions provided to maintain the gap between the layers. An electrical current flows between the two layers. If a layer is pressed so as to come into contact with the other layer, a resistance between the layers may be changed and thus an electric voltage is also changed. A touched point may be recognized by detecting the change in electric voltage.

In the screen 10 so configured, images may be displayed on the display 20. A controller 40 for receiving signals from the detector 30 and processing the received signals may be connected to the screen 10. Further, a switch 50 for selectively blocking the signals transferred from the detector 30 to the controller 40 may be connected to the controller 40 or between the detector 30 and the controller 40.

In FIG. 2, a touch screen device according to an embodiment is described in more detail. As shown in FIG. 2, the screen 10 may comprise a touch screen or detector 30 and a display 20. In this embodiment, a thin film transistor liquid crystal display CTFT-LCD) may be used as the display 20. The controller 40 may comprise a touch screen or detector controller 42, a main controller 44, a data storage device 46, a user command storage device 45, and a random access memory (RAM) 47.

The touch screen or detector 30 may be connected to the touch screen or detector controller 42 for signalizing a touch detected by the touch screen or detector 30. The touch screen or detector controller 42 may convert a change in an amount of electric current or high frequency waveform corresponding to an input position on the touch screen or detector 30 into a digital signal. The display 20 and the touch screen or detector controller 42 may be connected to and operated under the control of a main controller 44.

A user command storage device 45 for storing information on commands including a holding command and an activation command in correspondence with a digital signal received from the detector controller 42 may be connected to the main controller 44. The user command information stored in the user command storage device 45 may include user commands for holding or activating only some functions, in addition to the holding command for holding all functions and the activation command for activating all functions.

Further, a data storage device 46 for storing, for example, MP3 files may be connected to the main controller 44. In one embodiment, a NAND memory capable of rapidly and easily storing and reading out a large amount of information may be used as the data storage device 46.

A portion of the data storage device 46 may be used as the user command storage device 45. Use of a separate user command storage device 45 constructed of a NOR memory that is relatively superior in the stability of information may be advantageous.

A universal serial bus (USB) port 48 serving as an interface for modifying data may be connected to the main controller 44. The USB port 48 may be connected to an external device such that the user command information and corresponding touch types can be updated, deleted or modified. The main controller 44 may be provided with a random access memory SAM) 47 for driving the display device, for which a synchronous dynamic RAM (SDRAM) may be used.

As shown in FIG. 3A, the switch 50 may be mounted on an earphone or earphone set 54 which may be connected to a main body 52 of the MP3 player according to one embodiment. The switch 50 may transmit an on/off signal for blocking or connecting the signals output by the detector 30 to the controller 40 through an output terminal (not shown) of the earphone or earphone set 54. Accordingly, the controller 40 may block or connect the signals output by the detector 30.

For example, whenever the switch 50 is pressed once, the signals of the detector 30 may be blocked or connected such that a holding mode and an activation mode are switched between each other. The holding mode may be a state in which, even though the detector 30 detects a touch, the controller 40 does not respond to the external touch. On the other hand, the activation mode may be a state in which the controller 40 responds to the touch detection by the detector 30. Therefore, the switch 50 may allow a mode of the MP3 player to be adjusted simply by manipulating the switch 50 mounted to the earphone or earphone set 54, when, for example, the MP3 player is stored in, for example, a pocket or bag.

Herein, various kinds of holding signals and activation signals may be employed when holding or activation commands are executed using the switch 50. The various kinds of holding signals and activation signals may include a partial holding signal for holding only some functions, a partial activation signal for activating only some functions, and the like. For example, embodiments may be configured in such a manner that only the other functions except a volume control function are held if the switch 50 is pressed twice.

As shown in FIG. 3B, according to another embodiment, the switch 50 may be mounted on a wireless earphone or earphone set 56 employing short range wireless communication. The switch 50 in FIG. 3B may also transmit an on/off signal for blocking or connecting the signals of the detector 30 to the controller 40 by transmitting a short range wireless signal. A wireless communication method, such as ZigBee™ or Bluetooth™ method, may be used for the short range wireless communication signals. The ZigBee™ method consumes less power and has a wider transmission range; however, the ZigBee™ method has a disadvantage that the amount of data transmittable is less than that of the Bluetooth™ method. However, the ZigBee™ method has an advantage that the amount of data of the on/off signal is much smaller than that of the Bluetooth™ method.

According to another embodiment, only a screen 10 and a controller 40 may be included. In this embodiment, the screen 10 may be configured such that the activation mode and the holding mode are switched between each other according to the input signals input into the detector 30.

That is, the controller 40 of this embodiment may cause the detector 30 to be switched to a holding mode when a holding signal is input into the detector 30 such that the input signals input into the detector 30 are not processed. Alternatively, the controller 40 may cause the detector 30 to be switched to an activation mode when an activation signal is input into the detector 30.

The activation signal may be a command that causes the detector 30 to be switched from the holding mode to the activation mode, whereas the holding signal may be a command that causes the detector 30 to be switched from the activation mode to the holding mode. The holding signal and the activation signal may be defined, stored, and changed by a user. For example, a diagonal line may be stored as a holding signal such that the diagonal line can be recognized as the holding signal when a user draws the diagonal line on the detector 30 using, for example, a stylus pen 60, as shown in FIG. 4A. Further, a circle may be stored as an activation signal such that the circle can be recognized as the activation signal when the user draws the circle on the detector 30, as shown in FIG. 5B.

Of course, a variety of touch types may be employed to correspond to the various kinds of holding signals and activation signals. That is, partial holding signals for holding only some functions and partial activation signals for activating only some functions may be stored according to a variety of touch types.

Hereinafter, operation of embodiments will be described.

First, an operation method according to an embodiment may start by connecting the earphone or earphone set 54 to an MP3 player. A user may connect the earphone or earphone set 54 to the MP3 player, play back music, and put the MP3 player into, for example, a pocket, purse, or bag.

Then, the user may operate the switch 50 mounted to the earphone or earphone set 54 and cause the detector 30 to be switched to a holding mode. Since, in this embodiment, the detector 30 is switched to the holding mode, the detector 30 does not respond to the input signals input to the touch screen device. Thereafter, the user may cause the detector 30 to be switched to an activation mode using the switch 50, take the MP3 player out of the pocket, and input a new input signal to operate the MP3 player.

Another embodiment operates in a similar way as the above described embodiment, except that the on/off signals may be transmitted using the short range wireless communications.

FIG. 4 is a flowchart of an operating method according to an embodiment. As shown in FIG. 4, a signal input into the detector 30 may be first detected, in step S100. Next, it may be checked whether the detector 30 is in a holding mode, in step S200. The holding mode may be a mode in which even though the signal is input into the detector 30, the controller 40 does not process the input signal. The reason is that an unintended command is not executed when the detector 30 is inadvertently pressed contrary to the intention of the user.

If the detector 30 is in a holding mode, it may be determined whether the input signal is an activation signal, in step S210. The determination whether the input signal is an activation signal may be made by comparing the input signal with the activation signal previously defined and stored by the user.

If it is determined that the input signal is an activation signal, the detector 30 may be switched to an activation mode and then stand by to receive a new input signal, in steps S211 and S300. If the input signal is not an activation signal, it may be a general signal other than the activation signal that is input in a state where the detector 30 is still in a holding mode. Thus, the detector 30 may not respond to the input signal and stand by to receive a new input signal, in step S300.

On the other hand, if the detector 30 is not in a holding mode, it may be determined whether the input signal is a holding signal, in step S220. In the same manner as the determination of whether the input signal is an activation signal, the determination whether the input signal is a holding signal may be made by comparing the input signal with the holding signal defined and stored by the user.

If the input signal is not a holding signal, the input signal may be processed, in step S221. However, if the input signal is a holding signal, the detector 30 may be switched to a holding mode, in step S222.

FIG. 5A shows input of a holding signal using, for example, a stylus pen 60. In this embodiment, the holding signal may be input using a diagonal drag movement on the detector 30. If the holding signal is input as shown in FIG. 5A, the detector 30 may be switched to a holding mode and may not process the input signals. In this embodiment, the activation signal may be input using a diagonal drag movement on the detector 30. If an activation signal is input as shown in FIG. 5B, the detector 30 may be switched to an activation mode and processes the input signals.

Alternatively, various movements, for example, a diagonal or circular drag, may be utilized to activate or deactivate various select functions. For example, a circular drag in a first direction, for example, clockwise, may activate a music function. A circular drag in a second direction, for example, counter-clockwise, may deactivate the music function. Other type movements may correspond to activation or deactivation of other functions, such as a camera function, a video function, etc. Additionally, various touches may activate or deactivate a display of questions to a user regarding various functions.

In alternate embodiments, the touch screen device may be activated by removing a stylus pen 60 from a housing (not shown) provided on the device. Further, the touch screen device may be de-activated by returning the stylus pen 60 to the housing.

A touch screen device according to embodiments may have at least the following advantages.

The detector may be switched between an activation mode and a holding mode according to the selection of a user. Therefore, a MP3 player may be controlled such that it does not operate in response to input signals contrary to the intention of the user.

Further, the activation signal and the holding signal may be defined by the user. Thus, when the MP3 player is maintained in a holding mode, a stranger who does not know the activation signal cannot operate the MP3 player. Therefore, it may be possible to prevent a stranger from using the MP3 player without permission.

Further, even though buttons other than a power button may not be provided, all the operations may be controlled using a touchpad. Therefore, a simple design may be implemented.

Embodiments provide a touch screen device and an operating method thereof, wherein any input through a touch screen device is restricted while a user does not want.

According to one embodiment broadly described herein, there is provided a touch screen device, including a screen unit including a display unit for displaying images thereon and a detection unit for detecting a touch on a screen by a user, a control unit for controlling an operation of the device in accordance with the screen touch detected by the detection unit, and a switch for selectively allowing or preventing a signal of the detection unit to be or from being transmitted to the control unit. The switch may be mounted to an earphone that the user wears. The switch may allow an on/off signal for blocking or connecting a signal output by the detection unit to be transmitted to the control unit through an output terminal of the earphone.

Further, the earphone may be a wireless earphone employing short range wireless communications and the on/off signal is a short range wireless communication signal. The short range wireless communication signal may be a wireless signal employing a ZigBee™ or Bluetooth™ method.

According to another embodiment broadly described herein, there is provided a touch screen device, including a screen unit including a display unit for displaying images thereon and a detection unit for detecting a touch on a screen by a user, and a control unit for controlling an operation of the device in accordance with the screen touch detected by the detection unit, wherein the control unit ignores input signals input from the display unit until an activation signal is input from the display unit, if a holding signal is input from the display unit. At least one of the holding and activation signals may be input or changed by the user.

According to a further embodiment broadly described herein, there is provided a method of operating a touch screen device, including detecting a signal input through a touch screen, determining whether the input signal is a holding signal and then switching the touch screen to a holding mode for preventing the input signal from being transferred to the control unit if it is determined that the input signal is the holding signal, and determining whether the input signal is an activation signal and then switching the touch screen from the holding mode to an activation mode if it is determined that the input signal is the activation signal. The method may further include transferring the input signal to the control unit and then processing the transferred input signal if the touch screen is in the activation mode and the input signal is a signal other than the holding signal. At least one of the holding and activation signals may be defined and set by the user.

According to a still embodiment broadly described herein, there is provided digital equipment mounted with a touch screen device which includes a screen unit including a display unit for displaying images thereon and a detection unit for detecting a touch on a screen by a user, a control unit for controlling an operation of the device in accordance with the screen touch detected by the detection unit, and a switch for selectively allowing or preventing a signal of the detection unit to be or from being transmitted to the control unit.

According to another embodiment broadly described herein, there is provided digital equipment mounted with a touch screen device which includes a screen unit including a display unit for displaying images thereon and a detection unit for detecting a touch on a screen by a user, and a control unit for controlling an operation of the device in accordance with the screen touch detected by the detection unit. The control unit may ignore input signals input from the display unit until an activation signal is input from the display unit, if a holding signal is input from the display unit.

According to yet another embodiment broadly described herein, there is provided a method of operating digital equipment mounted with a touch screen device, including detecting a signal input through a touch screen, determining whether the input signal is a holding signal and then switching the touch screen to a holding mode for preventing the input signal from being transferred to the control unit if it is determined that the input signal is the holding signal, and determining whether the input signal is an activation signal and then switching the touch screen from the holding mode to an activation mode if it is determined that the input signal is the activation signal.

Embodiments broadly described herein further provide a touch screen device, including a screen including a display configured to display images thereon and a detector configured to detect a touch on the screen, a controller configured to control an operation of the touch screen device in accordance with the screen touch detected by the detector, and a switch configured to selectively allow or prevent a signal of the detector to be or from being transmitted to the controller. The switch may be mounted on an earphone. Further, the switch may allow an on/off signal for blocking or connecting a signal output by the detector to be transmitted to the controller through an output terminal of the earphone.

The switch may be mounted within a stylus housing. When the stylus is removed from the housing, the switch may allow the signal of the detector to be transmitted to the controller, and when the stylus is returned to the housing, the switch may prevent the signal of the detector from being transmitted to the controller.

The earphone may be a wireless earphone employing short range wireless communications and the on/off signal a short range wireless communication signal. The short range wireless communication signal may be a wireless signal employing a ZigBee™ or Bluetooth™ method.

Digital equipment may include the disclosed touch screen device. The digital equipment may include a MP3 player, a PDA, a portable media player, a portable terminal, a navigation system, or a notebook computer.

Embodiments broadly described herein further provide a touch screen device, including a screen including a display configured to display images thereon and a detector configured to detect a touch on the screen, and a controller configured to control operation of the touch screen device in accordance with the screen touch detected by the detector, wherein the controller ignores signals input from the detector until an activation signal is input to the controller, if a holding signal is input to the controller. The at least one of the holding and activation signals may be input or changed by a user.

The touch screen device may further include a stylus housing. When the stylus is removed from the housing, the activation signal is input to the controller, and when the stylus is returned to the housing, the holding signal is input to the controller.

Digital equipment may include the disclosed touch screen device. Further, the digital equipment may include a MP3 player, a PDA, a portable media player, a portable terminal, a navigation system, or a notebook computer.

Embodiments broadly described herein further provide a touch screen device, including a screen including a display configured to display images thereon and a detector configured to detect a touch on the screen, a controller configured to control an operation of the touch screen device in accordance with the screen touch detected by the detector, and a switch configured to deactivate or reactivate functions of the touch screen device. The switch may be mounted on an earphone. Further, the earphone may be a wireless earphone employing short range wireless communications. The short range wireless communication signal may be a wireless signal employing a ZigBee™ or Bluetooth™ method.

The switch may be mounted within a stylus housing. When the stylus is removed from the housing, the switch activates functions of the touch screen device, and when the stylus is returned to the housing, the switch deactivates functions of the touch screen device.

Furthermore, digital equipment may include the disclosed touch screen device. The digital equipment may include a MP3 player, a PDA, a portable media player, a portable terminal, a navigation system, or a notebook computer.

Embodiments broadly described herein further provide a touch screen device, including a touch panel configured to detect a screen touch by a user, a touch panel controller configured to signalize the touch detected on the touch panel and controlling the touch panel, a display configured to display images, a user command storage device configured to store types of the touch and corresponding user commands, and a main controller configured to control operations of the touch panel controller and the display. The user command information may include a holding command for terminating inputs from the touch panel and an activation command for canceling a holding mode. The user command information may include a partial holding command for terminating inputs from only some functions and a partial activation command for canceling only the holding mode of some functions.

Further, the user command storage device may include a NOR flash memory. The device may also include a USB port connected to an external device configured to update or modify the user command information stored in the user command storage device. The device may further include a data storage device configured to store data of the touch screen device, and a RAM configured to drive the touch screen. A portion of the data storage device may be configured into the user command storage device.

Embodiments broadly described herein further provide a method of operating a touch screen device, including detecting a signal input from a switch, determining whether the input signal is a holding signal and then switching the touch screen device to a holding mode in which signals input through a touch screen are prevented from being transferred to a controller if it is determined that the input signal is the holding signal, and determining whether the input signal is an activation signal and then switching the touch screen from the holding mode to an activation mode if it is determined that the input signal is the activation signal. The method may further include transferring the input signal to the controller and then processing the signals input through a touch screen if the touch screen is in the activation mode and the input signal is a signal other than the holding signal. The at least one of the holding and activation signals may be defined and set by a user.

A method of operating digital equipment mounted with a touch screen device may include the disclosed method. The digital equipment may include a MP3 player, a PDA, a portable media player, a portable terminal, a navigation system, or a notebook computer.

Embodiments broadly described herein further provide a method of operating a touch screen device, including detecting a signal input from a touch screen, determining whether the input signal is a holding signal and then switching the touch screen device to a holding mode in which signals input through a touch screen are ignored by a controller if it is determined that the input signal is the holding signal, and determining whether the input signal is an activation signal and then switching the touch screen from the holding mode to an activation mode if it is determined that the input signal is the activation signal. The method may further include transferring the input signal to the controller and then processing the signals input through a touch screen if the touch screen is in the activation mode and the input signal is a signal other than the holding signal. The at least one of the holding and activation signals may be defined and set by a user.

A method of operating digital equipment mounted with a touch screen device may include the disclosed method. The digital equipment may include a MP3 player, a PDA, a portable media player, a portable terminal, a navigation system, or a notebook computer.

Embodiments broadly described herein further provide a method of operating a touch screen device, including detecting a signal input from a switch, determining whether the input signal is a holding signal and then switching the touch screen to a holding mode in which functions of the touch screen device are deactivated if it is determined that the input signal is the holding signal, and determining whether the input signal is an activation signal and then switching the touch screen from the holding mode to an activation mode in which the functions of the touch screen device are reactivated if it is determined that the input signal is the activation signal. The method may further include transferring the input signal to the controller and then processing the signals input through the touch screen if the touch screen is in the activation mode and the input signal is a signal other than the holding signal. At least one of the holding and activation signals may be defined and set by a user.

Further, a method of operating digital equipment mounted with a touch screen device may include the disclosed method. The digital equipment may include a MP3 player, a PDA, a portable media player, a portable terminal, a navigation system, or a notebook computer.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings and the appended claims without departing from the spirit of the disclosure. In addition to variations and modifications in the component parts and/or arrangements, alternative uses will also be apparent to those skilled in the art.

What is claimed is:

1. A method of operating a touch screen device in portable electronic equipment, the touch screen device including an earphone having a switch mounted thereon configured to be manually manipulated by a user, and main body configured to be electronically connected to the earphone, the main body comprising a touch screen having a predetermined viewing area configured to display images thereon and a detector configured to detect a touch on the touch screen and generate a signal corresponding to the touch, and a controller configured to control the main body in accordance with signals received from the detector, the method comprising:

controlling the main body to remain in a holding mode in which the main body does not respond to any touch on the touch screen except an activation touch for transitioning from the holding mode to an activation mode, comprising deactivating at least two functions of the main body including a first function and a second function in the holding mode;

detecting a partial activation signal input at the switch on the earphone; and in response to the partial activation signal, controlling the main body to transition from the holding mode to a partial activation mode in which the main body continues not to respond to any touch on the touch screen except a holding touch for transitioning from the partial activation mode to the holding mode, comprising activating only a predefined function of the at least two functions in the partial activation mode such that the first function is activated while the second function remains deactivated in the partial activation mode, wherein when the switch on the earphone is manipulated in a first way, the main body is transitioned from the holding mode to the activation mode, and when the same switch on the earphone is manipulated in a second way, the main body is transitioned from the holding mode to the partial activation mode.

2. The method of claim 1, wherein activating only a predefined function of the at least two functions in the partial activation mode comprises activating a sound function of the main body.

3. The method of claim 1, wherein the portable electronic equipment is a mobile communication terminal capable of playing multimedia files.

4. A touch screen device for mobile communication terminal capable of playing multimedia files, comprising:

an earphone having a switch mounted thereon, wherein the switch is configured to be manually manipulated by a user;

a main body configured to be electronically connected to the earphone, the main body comprising:

a touch screen having a predetermined viewing area configured to display images thereon;

a detector configured to detect a touch on the touch screen and generate a signal corresponding to the touch; and a controller configured to control the main body in accordance with signals received from the detector, wherein the controller is further configured to:

control the main body to remain in a holding mode in which the main body does not respond to any touch on the touch screen except an activation touch for transitioning from the holding mode to an activation mode, and to deactivate at least two functions of the main body including a first function and a second function in the holding mode;

detect a partial activation signal input at the switch on the earphone; and in response to the partial activation signal, control the main body to transition from the holding mode to a partial activation mode in which the main body continues not to respond to any touch on the touch screen except a holding touch for transitioning from the partial activation mode to the holding mode, and to activate only a predefined function of the at least two functions in the partial activation mode such that the first function is activated while the second function remains deactivated in the partial activation mode, wherein when the switch on the earphone is manipulated in a first way, the main body is transitioned from the holding mode to the activation mode, and when the same switch on the earphone is manipulated in a second way, the main body is transitioned from the holding mode to the partial activation mode.

* * * * *